US008439995B2

(12) United States Patent
Chinone

(10) Patent No.: US 8,439,995 B2
(45) Date of Patent: May 14, 2013

(54) ABRASIVE COMPOUNDS FOR SEMICONDUCTOR PLANARIZATION

(75) Inventor: Kanshi Chinone, Hitachi (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 416 days.

(21) Appl. No.: 12/761,542

(22) Filed: Apr. 16, 2010

(65) Prior Publication Data

US 2010/0192472 A1 Aug. 5, 2010

Related U.S. Application Data

(62) Division of application No. 10/568,147, filed as application No. PCT/JP2004/011549 on Aug. 11, 2004, now abandoned.

(30) Foreign Application Priority Data

Aug. 14, 2003 (JP) ................................. 2003-293438

(51) Int. Cl.
| | | |
|---|---|---|
| B24D 3/02 | (2006.01) | |
| C09C 1/68 | (2006.01) | |
| C09K 3/14 | (2006.01) | |
| B02C 7/00 | (2006.01) | |
| B01D 29/00 | (2006.01) | |
| B01D 29/46 | (2006.01) | |
| B01D 24/00 | (2006.01) | |

(52) U.S. Cl.
USPC ............. 51/307; 210/488; 210/503; 210/505; 241/24.21

(58) Field of Classification Search .................. 210/490, 210/503–508; 51/298, 307, 309; 106/3; 423/263, 423/692–693; 241/24.15, 24.21
See application file for complete search history.

(56) References Cited

U.S. PATENT DOCUMENTS

| | | | |
|---|---|---|---|
| 6,221,118 B1 | 4/2001 | Yoshida et al. | |
| 6,299,659 B1 | 10/2001 | Kido et al. | |
| 6,409,780 B1 * | 6/2002 | Yano et al. | ....................... 51/307 |
| 6,478,836 B1 | 11/2002 | Kido et al. | |
| 2002/0095873 A1 | 7/2002 | Lortz et al. | |
| 2003/0064671 A1 | 4/2003 | Pasqualoni et al. | |
| 2004/0031206 A1 * | 2/2004 | Uchino et al. | ................... 51/307 |

FOREIGN PATENT DOCUMENTS

| | | | |
|---|---|---|---|
| EP | 0939431 A1 | | 9/1999 |
| JP | 10-154673 A | | 6/1998 |
| JP | 2000-026840 A | | 1/2000 |
| JP | 2002-212544 A | | 7/2002 |
| JP | 2002-371267 A | | 12/2002 |
| JP | 2003-007660 A | | 1/2003 |
| JP | 2003-171653 A | | 6/2003 |
| JP | 2003-188122 A | | 7/2003 |
| WO | WO 03/025085 | * | 3/2003 |

OTHER PUBLICATIONS

Japanese office Action dated Dec. 8, 2009, issued in corresponding Japanese Patent Application No. 2005-513167 (English Translation).
Korean Office Action dated Dec. 8, 2006, issued in corresponding Korean Patent Application No. 10-2006-7002813.
T. Honma et al, "Effect of Various Factors on Grinding Using Jet Mill", Chemical Engineering Paper Collection, vol. 6, No. 5, pp. 527-532, 1980.
International Search Report of PCT/JP2004/011549, mailing date of Nov. 22, 2004.
Japanese office Action dated Mar. 10, 2009, issued in corresponding Japanese Patent Application No. 2005-513167 (English Translation).

* cited by examiner

*Primary Examiner* — Pegah Parvini
(74) *Attorney, Agent, or Firm* — Westerman, Hattori, Daniels & Adrian, LLP

(57) ABSTRACT

A polishing slurry for semiconductor planarization containing cerium oxide particles and water, wherein the content of the cerium oxide particles having a diameter of 3 μm or more is 500 ppm or less (weight ratio) in a solid, preferably 100 ppm or less and it is more preferable that D99 (99% by volume of the whole particles in polishing slurry) of the cerium oxide particles is 1 μm or less. The polishing slurry can reduce the generation of scratches, and can polish a surface of the semiconductor substrate in the wiring formation process of semiconductor device precisely at a high speed.

11 Claims, 1 Drawing Sheet

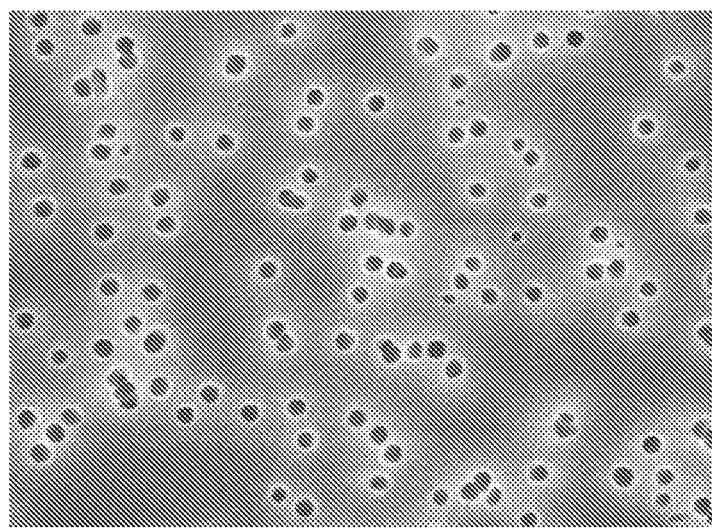

ABRASIVE COMPOUNDS FOR SEMICONDUCTOR PLANARIZATION

This is a divisional application of U.S. application Ser. No. 10/568,147 filed on Feb. 13, 2006, now abandoned, which is a National Stage Application filed under 35 U.S.C. §371 of International Application PCT/JP2004/0011549 filed on Aug. 11, 2004, which are hereby incorporated by reference.

TECHNICAL FIELD

The present invention relates to a polishing slurry, and particularly relates to polishing slurries for semiconductor planarization.

BACKGROUND ART

A precise polish process for polishing the surface of a material is required in, for example, optical disk substrates, a magnetic disks, glass substrates for flat panel displays, clock boards, camera lenses, glass material used for various lenses and crystal material for filters or the like for optical components, substrates of a silicon wafer or the like for semiconductors, and insulated films, metal layers and barrier layers or the like formed in each process for manufacturing semiconductor devices. The surfaces of these materials require high accuracy polishing. Therefore, for example, polishing agents have been generally used, using silica, zirconium oxide and alumina or the like alone or in combination of two or more kinds as polish particles. Referring to a form of the polishing agent, for example, a slurry-like polishing agent obtained by dispersing the polish particles in a fluid, a polishing agent obtained by curing the polish particles with a resin and other binder, and a polishing agent obtained by adhering and/or fixing only particulates of the polish particles on the substrate surface of fiber, resin and metal or the like with the binder have been generally used.

A silica polishing slurry using particularly silica particulates as the polish particles has been widely used as the polishing slurry for precision polish for a wiring formation or the like in the manufacture of a semiconductor integrated circuit (hereinafter, referred to semiconductor) because of little scratch generation of a surface to be polished. However, since the polishing speed of the silica polishing slurry is slow, attentions have been recently focused on a cerium oxide polishing slurry containing cerium oxide having a fast polishing speed (for example, see Japanese Patent Application Laid-Open Nos. 2000-26840 and 2-371267). However, the cerium oxide polishing slurry has a problem of generating more scratches as compared with the silica polishing slurry.

Though the cerium oxide polishing slurry has been used for glass polish for many years, it has been necessary to avoid impurity contamination as much as possible so as to apply the cerium oxide polishing slurry to the planarization of the semiconductor. Then, rare earth materials are refined once, and a high purity cerium oxide is obtained via a cerium salt. As the cerium salt, cerium carbonate, cerium oxalate and cerium nitrate or the like are used. The polishing slurry for semiconductor planarization has been manufactured by dispersing the cerium oxide obtained by calcining and grinding these cerium salts.

Though it has been presumed that the scratches generated in the polish process relate to the particle diameter of the polishing slurry, quantitive evaluation results have been seldom obtained. It has been said that the scratches are decreased when a filter in the manufacturing process is used and coarse particles are removed in the case of the silica polishing slurry. In this case, the relationship between the physical properties of the polishing slurry after filtration and the scratches is not apparent.

Though it has been considered that the cerium oxide polishing slurry has a larger mean particle diameter than that of the silica polishing slurry and has a great content of the coarse particles, since a measurement technique having high sensitivity has not been established, the reliability of the measurement results has been inadequate. Therefore, the relationship between the coarse particles and the scratches is merely conceptually understood, and an effective specific measure has been deficient.

For example, in a paragraph (0020) of Japanese Patent Application Laid-Open No. 10-154673, the maximum particle diameter is measured by a laser diffraction type particle size distribution meter, and Japanese Patent Application Laid-Open No. 10-154673 discloses that one having 1 µm or more is not contained. Thus, the scratches have been prevented by conventionally measuring using a laser diffraction type particle size distribution meter of Mastersizer (trade name, manufactured by Malvern Instruments Ltd.) or the like to reduce the maximum particle diameter of the particle.

However, even if the maximum particle diameter detected by the particle size distribution meter is reduced, the prevention of the scratches is limited, so that responding to integration of the semiconductor these days has been difficult.

Consequently, the present inventor has conducted earnest studies of the cause. As a result, the present inventor found that, in fact, particles of 3 µm or more considered not to exist in the measuring method using the particle size distribution meter exist in a very small quantity which is undetectable, and affect the scratches.

On the other hand, high integration of the semiconductor has been advanced, and processing size of wiring or the like is miniaturized to 100 nm. As the processing has been miniaturized, the defective reduction of the scratches or the like has been still strongly required, and the polishing slurry satisfying all of the polishing speed, planarization and scratch reduction has been required.

DISCLOSURE OF THE INVENTION

It is an object of the present invention to provide a polishing slurry for semiconductor planarization capable of maintaining a suitable polishing speed, reducing the generation of the scratches and precisely polishing the surface of the semiconductor.

The present inventor has conducted earnest studies of the reduction of the scratches due to the polishing slurry for semiconductor planarization. As a result, the present inventor found that the scratches can be decreased by removing the coarse particles contained in a small amount in the polishing slurry, thereby the present invention was accomplished.

A polishing slurry for semiconductor planarization of the present invention, containing cerium oxide particles and water, wherein the content of the cerium oxide particles having a diameter of 3 µm or more is 500 ppm or less in a solid.

Furthermore, it is preferable that the polishing slurry contains a dispersing agent.

Furthermore, it is preferable that the particle diameter is 1 µm or less in 99% by volume of the whole cerium oxide particles.

A surface of a semiconductor can be polished at a high speed in a wiring formation process by the present invention. Also, the surface of the semiconductor has good flatness, and scratches can be reduced.

BRIEF DESCRIPTION OF THE DRAWINGS

FIG. 1 is an example of the surface magnified photograph of a film (one layer) type filter for analysis punched by laser machining used for measuring the content of coarse particles in an Example of the present invention.

BEST MODE FOR CARRYING OUT THE INVENTION

Hereinafter, the embodiment of the present invention will be described in detail.

The polishing slurry for semiconductor planarization of the present invention (hereinafter, referred to as polishing slurry) contains the cerium oxide particles and the water.

As a cerium oxide polishing slurry used for polishing a silicon oxide film formed by a TEOS-CVD method or the like has a larger primary particle diameter, and has little crystal distortion, that is, good crystallinity, high-speed polishing can be performed. However, the silicon oxide film tends to have polishing scratches thereby. Therefore, it is preferable that the average value of the primary particle diameter of the cerium oxide used in the present invention is within the range of 5 nm to 300 nm while the cerium oxide particles do not limit the manufacturing method. Herein, "primary particle" means a particle equivalent to a crystallite surrounded by boundaries, measured and observed by SEM (scanning electron microscope).

Since the cerium oxide particles manufactured by the above method are easily flocculated, it is preferable that the cerium oxide particles are mechanically grinded. Preferable examples of grinding methods include a dry grinding method using a jet mill or the like, and a wet grinding method using a planet bead mill or the like. The jet mill is described in, for example, Chemical Industrial Paper Collection (Kagaku Kougyou Ronbunshu), vol. 6, No. 5 (1980), 527-532.

It is preferable that the polishing slurry of the present invention is a composition containing the cerium oxide particles, a dispersing agent and water. For example, the polishing slurry is obtained by dispersing the composition containing the cerium oxide particles produced by the above method and the dispersing agent in the water.

Though the concentration of the cerium oxide particles is not limited, the concentration is preferably within the range of 0.5% to 20% by weight, more preferably 1% to 10% by weight, and still more preferably 1.5% to 5% by weight in view of easiness for handling the polishing slurry in the form of a liquid dispersion.

The dispersing agent is preferably a polymer dispersing agent containing, for example, an acrylic acid ammonium salt as a copolymerization component since it is preferable to suppress the content of alkaline metals such as sodium ion and potassium ion, halogen and sulfur to 10 ppm or less in view of the use for polishing a semiconductor device.

The addition amount of the dispersing agent is preferably within the range of 0.01 parts to 5.0 parts by weight based on the cerium oxide particle of 100 parts by weight in view of the dispersibility and prevention of sedimentation of the particles in the polishing slurry, and the relationship between the polishing scratch and the addition amount of the dispersing agent.

The weight-average molecular weight of the dispersing agent is preferably within the range of 100 to 50,000, and more preferably 1,000 to 10,000. When the molecular weight of the dispersing agent is less than 100, sufficient polish speed is hardly obtained at the time of polishing the silicon oxide film or a silicon nitride film. When the molecular weight of the dispersing agent exceeds 50,000, the dispersing agent has high viscosity, and the preservation stability of the polishing slurry tends to be descended. In the present invention, the weight-average molecular weight is a value measured by gel-permeation chromatography and expressed in terms of standard polystyrene.

As a method for dispersing the cerium oxide particles in water, a homogenizer, an ultrasonic disperser and a wet ball mill or the like can be used in addition to a dispersing processing using a usual stirrer.

Since the secondary particle diameter of the cerium oxide particles in the polishing slurry of the present invention produced thus has a particle size distribution, it is preferable that the secondary particle diameter is 1.0 μm or less in 99% by volume (hereinafter, referred to D99) of the whole cerium oxide particles. If D99 exceeds 1.0 μm, the generation of the scratches is increased.

It is preferable that the median (hereinafter, referred to D50) of the secondary particle diameters of the cerium oxide particle is within the range of 0.03 to 0.5 μm, and more preferably 0.05 to 0.3 μm. When the median of the secondary particle diameters is less than 0.03 μm, the polish speed tends to be reduced. When the median exceeds 0.5 μm, the polishing scratches are easily generated on the surface of a film to be polished. The median (D50) and the D99 of the secondary particle diameters of the cerium oxide particles in the polishing slurry can be measured by a light scattering method, for example, a particle size distribution meter (for example, manufactured by Malvern Instruments Ltd., trade name: Mastersizer Microplus).

The content of coarse particles having a diameter of 3 μm or more occupied in the whole solid in the polishing slurry are preferably low. The coarse particle of 3 μm or more means a particle captured by filtering with a filter having a pore diameter of 3 μm in the present invention. The content of the particles having a diameter of 3 μm or more occupied in the whole solid in the polishing slurry in the present invention needs to be 500 ppm or less at a weight ratio, and, therefore, the scratch reduction effect is apparent. When the content of the particles of 3 μm or more occupied in the whole solid is 200 ppm or less, it is more preferable since the scratch reduction effect is larger. When the content of the particles of 3 μm or more occupied in the whole solid is 100 ppm or less, it is still more preferable since the scratch reduction effect is largest.

The content of the coarse particles of 3 μm or more can be calculated by the weight measurement of the particles captured by filtering with a filter having a pore diameter of 3 μm. After the polishing slurry is separately dried, the content of the whole solid in the polishing slurry is measured. For example, the weight of the remainder obtained by drying the polishing slurry of 10 g at 150° C. for 1 hour is measured to obtain the solid concentration. The mass of the polishing slurry used for filtering with a filter having a pore diameter of 3 μm is multiplied by the solid concentration, and thereby the content of the whole solid can be obtained. The filter having a pore diameter of 3 μm is preferably a film (one layer) type filter for analysis on which a hole is formed by laser processing. FIG. 1 shows an example of the surface magnified photograph of such a filter. Examples of commercial items include a cyclopore track etched membrane filter manufactured by Whatman. Since the pore size of such a filter for analysis is precise and the distribution is also uniform, the particles can be exactly separated by the particle size. It is suitable for observing the particles captured on the filter using an optical microscope or an electron microscope.

Examples of means for reducing the content of the coarse particles include filtration and classification, and are not limited thereto. A filter for mass production is preferable for the filtration for reducing the coarse particles. The filter for mass production has a multilayer structure. The area and the life can be increased by reducing the diameter of the holes continuously from the outside of the filter to the inside, and a great amount of polishing slurries can be filtered. However, the hole is formed by not the laser machining but the superposed filter fibers. Though the captured particle diameter can be changed by changing the diameter and density of the fiber, the fibers are not mutually fixed. Therefore, the hole may be enlarged, and particles may fall out so that the exact separation of the particles by the particle diameter is difficult. Therefore, even if the polishing slurry is passed through the filter for mass production having a pore diameter smaller than 3 μm, particles of 3 μm or more may be captured when the polishing slurry is then filtered through the filter for analysis having a pore diameter of 3 μm.

For example, the content of the coarse particles can be reduced by filtering multiple times through such a filter for mass production or by reducing the pore diameter of the filter for mass production.

The polymer additive agent for further improving flatness and dispersibility can be added to the polishing slurry. Though the polymer additive agent is not limited to the following ones, for example, polymers such as an acrylic ester derivative, acrylic acid and acrylic acid salt can be added. Though the addition amount of the polymer additive agent is not particularly limited, the addition amount is preferably within the range of 5 parts to 20 parts by weight to the cerium oxide particle of 100 parts by weight. The weight-average molecular weight of the polymer additive agent is preferably within the range of 100 to 50,000, and more preferably 1,000 to 10,000. When the molecular weight is less than 100, sufficient polish speed is hardly obtained at the time of polishing the silicon oxide film or a silicon nitride film. When the molecular weight exceeds 50,000, the dispersing agent has high viscosity, and the preservation stability of the polishing slurry tends to be descended.

The pH of the polishing slurry is preferably within the range of 3 to 9, and more preferably 5 to 8. When the pH is smaller than 3, the chemical operation force is reduced, and the polish speed tends to be decreased. When the pH is larger than 9, the chemical operation is too strong, and the surface to be polished may be dissolved in a shape of a dish (dishing). The pH was measured by a pH meter (for example, Model PH81, manufactured by YOKOGAWA ELECTRIC CORP.). After two-point calibrating using a standard buffer solution (a phthalic-acid salt pH buffer solution pH: 4.21 (25° C.), neutral phosphoric acid salt pH buffer solution pH 6.86 (25° C.)), an electrode is put into a polishing slurry, and the value after 2 minutes or more and being stabilized can be measured.

The polishing slurry of the present invention can be prepared as a single-liquid type polishing slurry comprising, for example, the cerium oxide particles, the dispersing agent, the polymer additive agent and water, and can also be prepared as a double-liquid type polishing slurry dividing a cerium oxide slurry comprising the cerium oxide particles, the dispersing agent and the water, and an adding liquid comprising the polymer additive agent and the water. In each case, the stabilized characteristic can be obtained.

When stored as double-liquid type polishing slurry dividing the cerium oxide slurry and the adding liquid, the planarization characteristic and polish speed can be adjusted by the arbitrary changeable combination of these two liquids. In the case of the double-liquid type, a method (immediately preceding mixture method) for sending the adding liquid and the cerium oxide slurry at an arbitrary flux by separate piping, and joining these pipings, that is, mixing both the adding liquid and the cerium oxide slurry just before a supplying piping outlet to supply on a polish plate, or a method (previous mixture method) for mixing both the adding liquid and the cerium oxide slurry at an arbitrary rate previously in a container and supplying is employed.

The polishing slurry of the present invention can be used for polish pressing a substrate against a polish cloth and pressurizing while supplying polish liquid between a film to be polished formed on the substrate and a polish cloth, and moving the polish cloth and the film to be polished relatively to polish the film to be even.

Examples of the substrates include a substrate for the formation process of a semiconductor device such as a substrate in which an inorganic insulating layer is formed on a semiconductor substrate of a stage where a circuit element and a wiring pattern are formed, or a semiconductor substrate of a stage where a circuit element is formed or the like. Examples of films to be polished include the inorganic insulating layer, for example, a silicon oxide film layer, and a silicon nitride film layer and an silicon oxide film layer.

Example 1

Hereinafter, though the present invention is specifically described with reference to examples, the present invention is not limited thereto.

Commercially available cerium carbonate of about 6 kg was put into an alumina container, and yellowish white powder of about 3 kg was obtained by firing the cerium carbonate at 800° C. in air for 2 hours. The powder was identified by an X-ray diffraction method, and was confirmed to be cerium oxide. The particle diameter of the fired powder was within the range of 30 to 100 μm. Furthermore, the obtained cerium oxide powder of 3 kg was dry grinded by using the jet mill to obtain the cerium oxide particles.

Cerium oxide particles of 1000 g produced above, an aqueous solution of ammonium polyacrylate of 80 g (40% by weight), and deionized water of 3920 g were mixed, and an ultrasonic distribution was performed for 10 minutes while the mixture was stirred. The obtained dispersion liquid was left and settled out at room temperature for 20 hours, and a supernatant fluid was obtained. After filtering the supernatant fluid through a filter for mass production having a pore diameter of 1.0 μm (filter fibers are mutually superposed to form a pore), the supernatant fluid was filtered through the filter for mass production having a pore diameter of 1.0 μm again, and the solid content concentration was adjusted to 5% by adding deionized water to produce a polishing slurry for semiconductor planarization.

Referring to the particle diameter of the obtained polishing slurry for semiconductor planarization, the undiluted the polishing slurry for semiconductor planarization was measured on the conditions of a refractive-index of 1.9285, a light source of He—Ne laser, and absorption 0 by using a laser diffraction type particle size distribution meter (manufactured by Malvern Instruments Ltd., trade name: Mastersizer Microplus). As a result, the median (D50) of the secondary particle diameters was 190 nm, and the D99 was 0.7 μm. In this measurement, the particles having a diameter of 3 μm or more were not detected.

The polishing slurry for semiconductor planarization obtained was diluted by 15 times so as to investigate the content of the coarse particles, and the diluted polishing slurry of 30 g was filtered through a filter having a pore diameter of 3 µm (a cyclopore track etched membrane filter, manufactured by Whatman). The filter was dried at room temperature after filtration, and the weight of the filter was measured. The amount of coarse particles of 3 µm or more was calculated from a increment in weight before and after filtration. The polishing slurry of 10 g was separately dried at 150° C. for 1 hour, and the solid concentration in the polishing slurry was calculated. As a result, the amount (weight ratio) of the coarse particles of 3 µm or more was 450 ppm in the solid.

The above polishing slurry for semiconductor planarization was diluted by 5 times with deionized water, and polish was performed by the following method. The polish speed was 650 nm/min. When the wafer surface was observed by an optical microscope, 20 scratches were observed on the whole surface of the wafer of 200 mm.

[Polish Test Method]

Polish Load: 30 kPa

Polish Pad: foamed polyurethane resin, manufactured by Rodel Inc. (IC-1000)

Number of Rotations: polish plate of 75 rpm, pad of 75 rpm,

Polishing slurry Supply Rate: 200 mL/min,

Polish Object: P-TEOS deposition Si wafer (200 mm)

Example 2

The cerium oxide particles of 1000 g produced in Example 1, an aqueous solution of ammonium polyacrylate of 80 g (40% by weight), and deionized water of 3920 g were mixed, and an ultrasonic distribution was performed for 10 minutes while the mixture was stirred. The obtained dispersion liquid was left and settled out at room temperature for 100 hours, and a supernatant fluid was obtained. After filtering the supernatant fluid through the filter for mass production having the pore diameter of 0.7 µm, it was filtered through the filter for mass production having the pore diameter of 0.7 µm again, and the solid content concentration was adjusted to 5% by adding deionized water to produce a polishing slurry for semiconductor planarization.

The particle diameter of the obtained polishing slurry for semiconductor planarization was measured in the same manner as Example 1. As a result, the median (D50) of the secondary particle diameters was 160 nm, and the D99 was 0.5 µm. The particles having a diameter of 3 µm or more were not detected.

So as to investigate the content of the coarse particles, the amount of coarse particles of 3 µm or more was calculated in the same manner as Example 1 from an increment in weight before and after filtering the obtained polishing slurry for semiconductor planarization. As a result, the amount of the coarse particles of 3 µm or more was 50 ppm in the solid.

The above polishing slurry for semiconductor planarization was diluted by 5 times with deionized water, and polish was performed by the same polish test method as that of Example 1. The polish speed was 350 nm/min. When the surface of the wafer was observed by an optical microscope, 10 scratches were observed on the whole surface of the wafer of 200 mm.

Comparative Example 1

The cerium oxide particles of 1000 g produced by the same method as in Example 1, and an aqueous solution of ammonium polyacrylate of 80 g (40% by weight), and deionized water of 3920 g were mixed, and an ultrasonic distribution was performed for 10 minutes while the mixture was stirred. The obtained dispersion liquid was left and settled out at room temperature for 4 hours, and a supernatant fluid was obtained. After filtering the supernatant fluid through the filter for mass production having the pore diameter of 10 µm, the solid content concentration was adjusted to 5% by adding the deionized water to produce a polishing slurry for semiconductor planarization.

The particle diameter of the obtained polishing slurry for semiconductor planarization was measured in the same manner as in Example 1. As a result, the median (D50) of the secondary particle diameters was 240 nm, and the D99 was 2.5 µm. The particles having a diameter of 3 µm or more were not detected.

So as to investigate the content of the coarse particles, the amount of coarse particles of 3 µm or more was calculated in the same manner as in Example 1 from the increment in weight before and after filtering the obtained polishing slurry for semiconductor planarization. As a result, the amount of the coarse particles of 3 µm or more was 1200 ppm in the solid.

The above polishing slurry for semiconductor planarization was diluted by 5 times with deionized water, and polish was performed by the same polish test method as that of Example 1. The polish speed was 700 nm/min. When the wafer surface was observed by an optical microscope, 100 scratches were observed on the whole surface of the wafer of 200 mm.

Comparative Example 2

The cerium oxide particles of 1000 g produced by the same method as in Example 1, and an aqueous solution of ammonium polyacrylate of 80 g (40% by weight), and deionized water of 3920 g were mixed, and an ultrasonic distribution was performed for 10 minutes while the mixture was stirred. The obtained dispersion liquid was left and settled out at room temperature for 4 hours, and the supernatant fluid was obtained. The solid content concentration was adjusted to 5% by adding deionized water to the supernatant fluid to produce a polishing slurry for semiconductor planarization.

The particle diameter of the obtained polishing slurry for semiconductor planarization was measured in the same manner as in Example 1. As a result, the median (D50) of the secondary particle diameters was 240 nm, and the D99 was 2.5 µm.

So as to investigate the content of the coarse particles, the amount of coarse particles of 3 µm or more was calculated in the same manner as in Example 1 from the increment in weight before and after filtering the obtained polishing slurry for semiconductor planarization. As a result, the amount of the coarse particles of 3 µm or more was 2500 ppm in the solid.

The above polishing slurry for semiconductor planarization was diluted by 5 times with deionized water, and polish was performed by the same polish test method as Example 1. The polish speed was 700 nm/min. When the wafer surface was observed by the optical microscope, 100 scratches were observed on the whole surface of the wafer of 200 mm.

According to Examples and Comparative Examples, the minor component of 1200 ppm (0.12%) or less of Comparative Example 1 cannot be detected by the laser diffraction type particle size distribution meter. On the other hand, the minor component of 50 ppm of Example 2 can be detected by a weight measuring method. From these results, the inventor considers that the weight measuring method has the higher measurement sensitivity for the coarse particles than the laser diffraction type particle size distribution meter.

INDUSTRIAL APPLICABILITY

The surface of the semiconductor in the wiring formation process can be polished at a high speed by the present invention. Also, the surface of the semiconductor has good flatness, and scratches can be reduced.

The invention claimed is:

1. A method for producing a polishing slurry for semiconductor planarization, comprising
   mechanically grinding cerium oxide particles,
   mixing at least a dispersing agent and water with the cerium oxide particles to prepare a polishing slurry,
   filtering the polishing slurry through a filter wherein holes of the filter are formed by superposing filter fibers and reducing the diameter of the holes continuously from the outside of the filter to the inside, wherein the filter fibers are not mutually fixed, and
   performing said filtering multiple times until the content of cerium oxide particles having a diameter of at least 3 μm is not more than 500 ppm, calculated based on the weight of particles obtained by filtering with a film filter for analysis on which hole diameters of 3 μm are formed by punching the film and the weight of all the solids in the polishing slurry,
   wherein said polishing slurry is capable of semiconductor planarization.

2. The method for producing a polishing slurry for semiconductor planarization according to claim 1, further comprising a classification step.

3. The method for producing a polishing slurry for semiconductor planarization according to claim 1, wherein 99% by volume of the cerium oxide particles have a size of less than 1.0 μm in said polishing slurry.

4. The method for producing a polishing slurry for semiconductor planarization according to claim 1, wherein the median diameter (D50) of secondary particles of the cerium oxide particles in said polishing slurry is in the range of 0.03 to 0.5 μm.

5. The method for producing a polishing slurry for semiconductor planarization according to claim 1, wherein the content of the cerium oxide particles having a diameter of at least 3 μm is not more than 200 ppm, calculated based on the weight of particles obtained by filtering with a film filter for analysis on which hole diameters of 3 μm are formed by punching the film and the weight of all the solids in the polishing slurry.

6. The method for producing a polishing slurry for semiconductor planarization according to claim 1, wherein the polishing slurry is a single-liquid type polishing slurry consisting essentially of the cerium oxide particles, a dispersant, a polymer additive and water.

7. The method for producing a polishing slurry for semiconductor planarization according to claim 1, wherein the polishing slurry is a double-liquid type polishing slurry consisting essentially of the cerium oxide particles, a dispersant, and water.

8. The method for producing a polishing slurry for semiconductor planarization according to claim 1, wherein the mechanically grinding is dry grinding.

9. The method for producing a polishing slurry for semiconductor planarization according to claim 8, wherein the dry grinding is by using a jet mill.

10. The method for producing a polishing slurry for semiconductor planarization according to claim 1, wherein the mechanically grinding is by wet grinding.

11. The method for producing a polishing slurry for semiconductor planarization according to claim 10, wherein the wet grinding is by using a planet bead mill.

* * * * *